(12) United States Patent
Tracy et al.

(10) Patent No.: US 8,448,893 B2
(45) Date of Patent: May 28, 2013

(54) LAMINAR FLOW WING OPTIMIZED FOR TRANSONIC CRUISE AIRCRAFT

(75) Inventors: Richard R. Tracy, Washoe Valley, NV (US); James D. Chase, Reno, NV (US)

(73) Assignee: Aerion Corporation, Reno, NV (US)

( * ) Notice: Subject to any disclaimer, the term of this patent is extended or adjusted under 35 U.S.C. 154(b) by 318 days.

(21) Appl. No.: 12/931,060

(22) Filed: Jan. 25, 2011

(65) Prior Publication Data
US 2012/0043429 A1 Feb. 23, 2012

Related U.S. Application Data

(63) Continuation-in-part of application No. 12/589,424, filed on Oct. 26, 2009.

(51) Int. Cl.
*B64C 29/00* (2006.01)
(52) U.S. Cl.
USPC .............................. 244/23 C; 244/35; 244/36
(58) Field of Classification Search
USPC ................ 244/23 C, 35 A, 36, 198, 204, 213, 244/214, 215, 130, 218, 45 R
See application file for complete search history.

(56) References Cited

U.S. PATENT DOCUMENTS

| | | | | |
|---|---|---|---|---|
| 4,834,617 A | * | 5/1989 | Wainauski et al. | 416/242 |
| 5,322,242 A | * | 6/1994 | Tracy | 244/36 |
| 5,518,204 A | * | 5/1996 | Tracy | 244/36 |
| 5,897,076 A | * | 4/1999 | Tracy | 244/117 A |
| 6,149,101 A | * | 11/2000 | Tracy | 244/130 |
| 7,000,870 B2 | * | 2/2006 | Tracy et al. | 244/130 |
| 2004/0056150 A1 | * | 3/2004 | Morgenstern | 244/45 R |
| 2011/0067393 A1 | * | 3/2011 | Chase | 60/484 |
| 2011/0095137 A1 | * | 4/2011 | Tracy et al. | 244/35 R |
| 2012/0049010 A1 | * | 3/2012 | Speer | 244/45 R |

FOREIGN PATENT DOCUMENTS

JP 1-141199 6/1989

OTHER PUBLICATIONS

Peter Sturdza, Valerie M. Manning, Ilan M. Kroo, Richard R. Tracy, "Boundary Layer Calculations Preliminary Design of Wings in Supersonic Flow", American Institute of Aeronautics and Astronautics, pp. 1-11, USA.

* cited by examiner

*Primary Examiner* — Christopher P Ellis
*Assistant Examiner* — Medhat Badawi
(74) *Attorney, Agent, or Firm* — William W. Haefliger (57) ABSTRACT

Aircraft configured to operate at Mach numbers from above 0.80 and up to 1.2 with wing sweep angles defined by the wing outboard leading edge of less than 35 degrees, and incorporating calculated values of the ratio of outboard wing panel aspect ratio raised to an exponent of 0.78, divided by the ratio of maximum thickness divided by chord (t/c), greater than about 45, characterized by one of the following: a) where maximum thickness divided by chord (t/c) is at a location approximately 70% of the distance outboard from the attaching aircraft body to the wing tip, or b) where maximum thickness divided by chord (t/c) is the average value of (t/c)'s located between approximately 50% of the distance outboard from the attaching aircraft body to the wing tip.

20 Claims, 8 Drawing Sheets

LAMINAR FLOW WING OPTIMIZED FOR TRANSONIC CRUISE AIRCRAFT

This application is a continuation-in-part of prior pending U.S. application Ser. No. 12/589,424, filed Oct. 26, 2009.

BACKGROUND OF THE INVENTION

This invention relates generally to the configuration of transonic aircraft with wings designed for extensive natural laminar flow (NLF), and more particularly to optimization of wing thickness, sweep and fuselage cross section relationship criteria, for such transonic aircraft.

There is need to improve the fuel efficiency and reduce carbon emissions of aircraft. Natural laminar flow (NLF) has been identified as a key technology in improving performance of aircraft through reduced drag, but there is a presumption that the reduced wing sweeps generally used to maintain natural laminar flow necessarily require a reduction in cruise speeds below Mach 0.80, and efficient aircraft of the future will be slower to foster efficiency. The invention described allows more efficient wings to be designed at current and higher speeds, e.g. Mach 0.80 to about Mach 1.2 Principal features are low to moderate sweep, and relatively thin airfoils in terms of the ratio of maximum thickness to chord (t/c). The importance of laminar boundary layer (BL) flow in terms of drag reduction can be understood by considering that for typical transonic cruise flight conditions the laminar skin friction drag is approximately a factor of ten less than turbulent skin friction drag associated with a traditional swept wing designs, for the same amount of surface area. At least equally important, the transonic NLF wing configurations described here can achieve best efficiency at higher Mach numbers than possible with the swept wings hitherto used on high speed subsonic aircraft.

For extensive NLF, the wing must have low or moderate sweep, and thus, on a purely aerodynamic basis the low sweep NLF wing should be as thin as needed to limit the volume wave drag at the design cruise Mach number. On the other hand a thinner wing incurs a weight penalty, since structural weight varies inversely with wing thickness, so that selection of thickness to chord ratio (t/c) is a key to optimizing the performance of such aircraft.

In previous studies, the NLF wing was designed to give best efficiency at about Mach 0.95 or higher. This work formed certain bases for U.S. Pat. No. 7,000,870, "LAMINAR FLOW WING FOR TRANSONIC CRUISE", incorporated herein by reference. This Mach number criterion led to the selection of about 3% (0.03) as an upper limit for the span-wise average t/c ratio of the NLF wing.

This prior patent specified no variation of t/c with design cruise Mach number. More recently, design studies have covered a range of efficient cruise Mach numbers down to about 0.80, which is near the maximum efficient cruise Mach number of any previous or current swept wing subsonic aircraft designed for long range. Based on continued research to design low and moderate sweep laminar flow wings for supersonic aircraft, some relationships have been discovered allowing increases in wing aspect ratio for given levels of Mach, t/c, and sweep not contained in prior art for aircraft designed for transonic and supersonic Mach numbers.

A common measure to compare the rise of drag of a wing as the Mach number approaches a value of 1.0 is the "drag divergence" Mach number ($M_{dd}$), which is commonly defined as the Mach number at which the drag coefficient of the wing has increased by 0.0020 (20 counts) relative to the low Mach drag for the same lift condition. Drag divergence Mach is a measure of the point of significant reduction in wing efficiency, although many aircraft are designed to cruise at Mach numbers somewhat higher than $M_{dd}$. The variation of maximum t/c vs $M_{dd}$ for well designed airfoils with zero sweep can be approximated by, $$(t/c) \leq 0.48(0.992 - M_{dd})$$

The well known effect of sweep in increasing $M_{dd}$ is a non-linear function, with 20 degrees increasing $M_{dd}$ approximately ~0.03, 30 degrees ~0.06, and 45 degrees ~0.11. An unstated assumption of the traditional value of high wing sweep for transonic and supersonic Mach numbers is the requirement for a practical wing structure of sufficient span to generate lift at acceptable drag. Said wing constitutes a beam structure whose lift loads along the span generate bending moments which require thickness to react at acceptable weight levels. In addition, the airloads acting along the wing vary along the streamwise chord direction generating torsional twisting moments which also require finite thickness to resist. Were it possible to design a practical wing with zero thickness, there would be no advantage for sweep at transonic Mach numbers as the volume wave drag would be zero. In practical wings, the long span and minimum thickness desired for aerodynamic efficiency is limited structurally as a function of the thickness along that span.

Aspect ratio (A) is defined as the square of the wingspan (B) divided by the reference area (S). Wings designed at the upper extremes of aspect ratio to minimize lift dependent drag generally become flutter or divergence critical, and additional structural material with added weight must be incorporated.

Pioneering work on the relationship of aerodynamics and structures in flutter and divergence on subsonic high aspect ratio wings was done by the NACA's Theodorsen and Garrick in the 1930's and 1940's. Subsequently, compressible flow was found to have a significant exacerbating effect on flutter and divergence for wings which operate in the transonic regime. The basic aero-elastic relationships of Theodorsen and Garrick were extended to low aspect ratio transonic and supersonic regime wings by Martin in 1958 as described in NACA TN 4197. In that work Martin derived simple relationships for the fundamental forces and structural stiffness and related them to a large test database of high speed low aspect ratio wings. Martin derived a key non-dimensional parameter that allows initial approximation of the wing stiffness requirements to resist flutter or divergence in the transonic regime:

$$X = 39.3(Ap^3)/[(t/c)^3(Ap+2)]$$

where Ap is the "panel aspect ratio" based on the exposed wing semi-span and trapezoidal area cantilevered from the side of an aircraft body. The t/c was based on the t/c at approximately 75% of the spanwise distance from the aircraft centerline to the wing tip. The (Ap+2) component of the denominator in Martin's work was derived from the basic relation to calculate lift curve slope ($\alpha$):

$$\alpha = 2\pi A/(A+2)$$

When calculating lift curve slope based on the panel aspect ratio Ap (body side to tip) rather than the traditional aerodynamic tip-to-tip aspect ratio (A), however, the lift curve slope becomes:

$$\alpha = 2\pi Ap/(Ap+1)$$

For the panel aspect ratios of interest (approximately 1 to 6), this function's basic proportionality can be approximated by a simplified wing geometry parameter, ATC defined as follows:

$$ATC = Ap^{0.78}/(t/c)$$

where the terms in the formula for ATC are defined above. When using panel aspect ratio, the (t/c) as measured at a section located 70% of the distance outboard of the aircraft body corresponds approximately to a location 75% of the spanwise distance as measured from aircraft centerline for typical aircraft. The 70% panel span distance definition is substituted for the ATC parameter described herein. A review of historical aircraft indicates no values of ATC above approximately 40 with the exception of a few low speed high aspect ratio aircraft that do not reach transonic speeds, and supersonic aircraft with sweep angles greater than 50 degrees.

The historical limitation to subsonic speeds for wings of ATC above approximately 40 and low sweep is explained by the fundamental forces that occur to low sweep wings as they experience compressibility effects approaching Mach 1. The lift curve slope (the derivative of lift coefficient with respect to wing angle of attack) increases significantly, generally reaching a maximum peak near Mach 0.95 to 1.0. This phenomenon increases the loads due to wind gusts and the forces tending to make a long thin wing diverge or flutter. In the case of a low sweep wing, the lift curve slope and associated gust loads increase by approximately 50% at Mach 0.95 relative to Mach 0.80. Aircraft generally must be designed by regulation to be flutter and divergence free at speeds 15% above the dive speed (Vd), which in turn is generally 0.07 Mach above the maximum design cruise speed (Mmo). Thus, aircraft designed to cruise above approximately Mach 0.80 must be designed to be flutter and divergence free up to this peak lift curve slope zone near Mach 1, requiring a combination of a structural weight penalty, thicker airfoil sections or shorter span resulting in reduced net efficiency. Progressively higher sweep angles with design cruise Mach numbers have been the traditional means to allow greater wing thickness for a given Mach number in order to minimize structural weight penalties.

Supersonic aircraft must traverse this critical transonic regime; however the high sweep angle typically used to date for such aircraft reduces the peak lift curve slope occurring near Mach 1, reducing the weight penalty for wing strengthening and stiffening. For example a 6/1 aspect ratio 35 degree sweep wing exhibits approximately 82% of the peak lift curve slope of a 15 degree sweep, and a 45 degree sweep reduces this to 65%.

As described in prior U.S. Pat. No. 7,000,870, "LAMINAR FLOW WING FOR TRANSONIC CRUISE", however, there are significant aerodynamic gains for wings of leading edge sweep angles between 0 and 35 degrees. First, it is feasible to reduce the boundary layer cross-flows fostering long runs of laminar flow which reduces the viscous drag. Second, the lower sweep wings exhibit reductions in lift-dependent drag in the proximity of Mach 1. This reduction in lift-dependent drag in the transonic regime is related directly to the same compressibility phenomenon that increases the lift curve slope and airloads the wing must be designed to resist.

A significant factor in designing wings that must operate in the transonic range has been the difficulty in reliably predicting the aerodynamic loads in the critical regime near Mach 1, and applying those loads to elastic structural finite element models (FEM). Recent improvements in computational fluid dynamics (CFD) codes and FEM's has allowed the design alternatives to be better understood in this critical non-linear transonic regime, and is of importance to designing reduced sweep transonic and supersonic aircraft wings.

Applicant herein has recently conducted aero-elastic wing design and structural analysis of a thin supersonic low sweep wing with a relatively high ATC value of 66, and found through advanced methods and structural tailoring that the aerodynamic advantages of lower sweep thin wings can be provided to more than offset the weight penalties of such wings.

NLF wings having an ATC parameter (combinations of aspect ratio and thickness as defined above) greater than about 45 will be able to fill a gap in efficient cruise Mach number between about 0.80 and 0.95. For example, a low sweep wing with Mach 0.82 design cruise and a 9% t/c airfoil, would enable an increase in feasible aspect ratio from about 8.5 to 12 or greater. Whereas a current aircraft in this general design space (Learjet) has a wing aspect ratio of 7.2.

Another example is a new long range executive aircraft (Gulfstream 650) designed for an efficient cruise speed of Mach 0.85 and a maximum cruise speed of Mach 0.925. It incorporates a wing of 7.7 aspect ratio and 36 degrees of leading edge sweep that is too great to foster significant laminar flow. With the herein invention, a wing of the same aspect ratio and cruise Mach number could be provided with reduced outboard thickness and 20 degree leading edge sweep, fostering significant laminar flow. Such wings can be provided for extensive NLF if the leading edge sweep is less than about 20 degrees by methods described herein and in our patent application referenced above, of which this is a continuation.

An important consideration in the ability to use wings of reduced sweep and drag at transonic and supersonic speeds is significant waisting of the aircraft fuselage and propulsion nacelle bodies in proximity to the wing in accordance with the area-rule. This allows significantly thicker wing t/c on the proximate 50% inboard span to provide the needed strength and stiffness of the wing at acceptable weight.

In addition, certain wing design criteria have been found to enable efficient cruise Mach numbers above 0.95 up to about 1.05, which is beyond the maximum efficient cruise Mach number of current high speed, long range aircraft. Such improved wings could require or would incorporate outboard t/c ratio of about 0.05 to less than 0.03 combined with aspect ratios greater than 6 and 3 respectively, in combination with greater leading edge sweep than the previous limit of about 20 degrees specified in U.S. Pat. No. 7,000,870. For example, a sweep of about 24 to 30 degrees and 3 to 4% t/c is indicated for an efficient cruise Mach number of 0.95; and a Mach 1.05 cruise speed indicates a 18 to 24 degree leading edge sweep and 2 to 3% outboard t/c. Achieving extensive NLF for such a wing sweep is more difficult and some loss in LF coverage extent is expected.

As previously noted in referenced parent patent application (Ser. No. 12/589,424), a number of considerations may drive the wing optimal thickness to higher values, even at the expense of a moderate increase in volume wave drag for a given design Mach number. For example the favorable pressure gradient, which stabilizes the wing laminar boundary layer, increases with t/c ratio, and as noted, structural weight decreases with increasing thickness. In addition, the volume wave drag attributable to the wing can be reduced by contouring the fuselage in the vicinity of the wing. Finally, the achievement of NLF on large areas of the wing surface is dependent on (a) achieving appropriate pressure gradients over the affected surfaces of the wing and (b) suitable leading edge size and shape. These pressure gradients depend not only on the local airfoil shapes, but also are influenced by the fuselage contours adjacent to the wing. There is, accordingly, need for improvements in transonic long range aircraft, and particularly in the optimization of the wing, airfoil shape and thickness, and wing aspect ratio, as well as the fuselage contours affecting both volume wave drag and NLF extent over the wing surfaces. Similar considerations can be applied to the design of horizontal and vertical tail surfaces.

Application Ser. No. 12/589,424 filed Oct. 26, 2009 is incorporated herein, by reference.

SUMMARY OF THE INVENTION

The present invention extends the use of wing configurations for aircraft designed or configured for efficient cruise at transonic speed, described in our prior U.S. Pat. No. 7,000,870, "LAMINAR FLOW WING FOR TRANSONIC CRUISE" as follows: for aircraft designed for maximum operating Mach number (Mmo) of greater than about 0.8, and having a value of ATC greater than about 45, all combinations of thickness to chord ratios above about 3% up to about 8% and wing sweep above about 0 degrees up to about 35 degrees.

The wing thickness to chord ratios may typically vary from the proximate 50% span position outboard from the aircraft body to wing tip, such that the average of such ratio along the span is consistent with the criterion stated in the foregoing. Thickness to chord inboard of the proximate 50% span is allowed to increase substantially commensurate with compensating area-rule waisting of the adjacent body and/or nacelle. Wing sweep refers to the leading edge sweep of the basic "trapezoidal wing" or minimum leading edge sweep in other cases such as the "ogival" wing planform. The invention concerns all airfoil types such as bi-convex, NACA 6-series and supercritical, appropriately modified to provide, at design cruise Mach number and lift coefficient, an optimal combination of (a) extensive laminar flow over upper, lower, or both surfaces, (b) low wave drag, and also (c) high lift at low speed.

In all cases the fuselage is shaped to reduce or minimize wave drag of the wing-fuselage combination, including engine nacelles and empennage. The foregoing principals generally apply to tail and canard surfaces as well.

DETAILED DESCRIPTION

Figures 1, 1A:
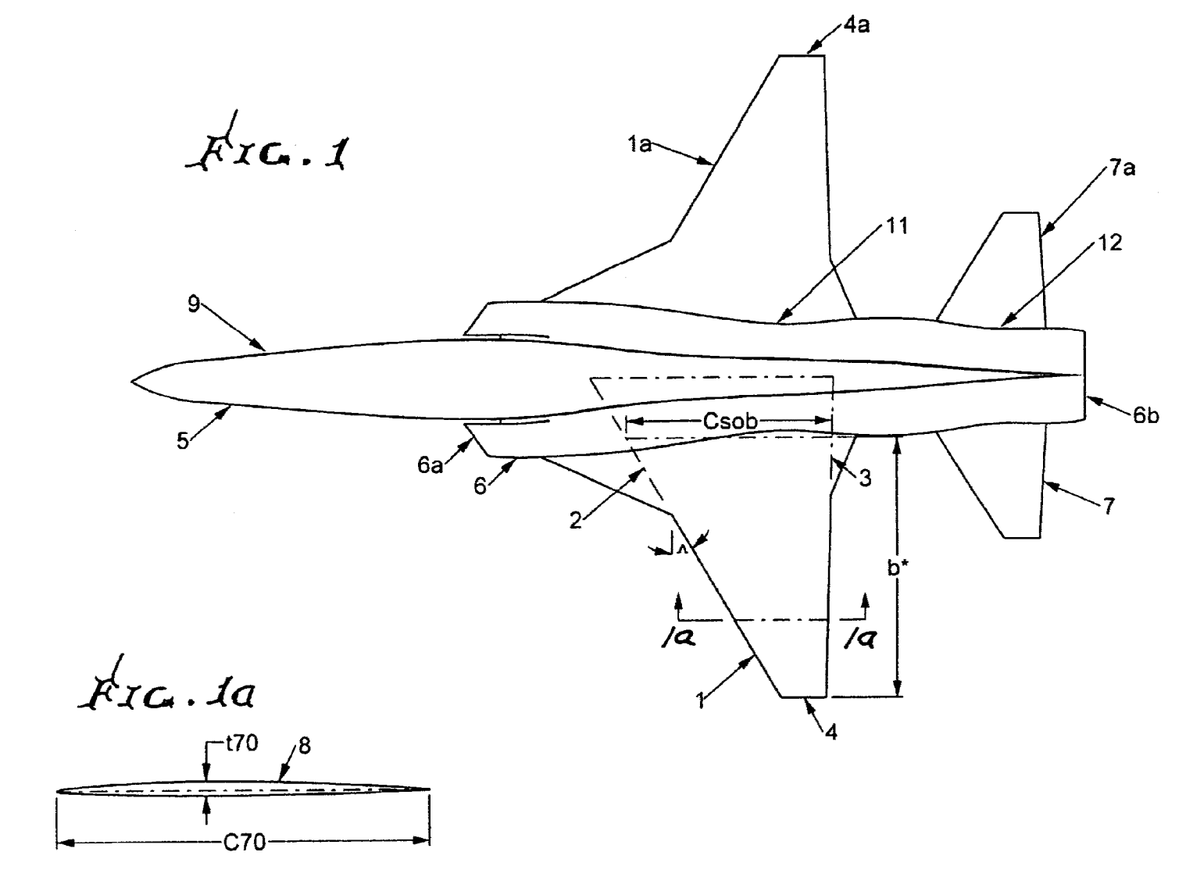
FIG. 1 is a plan view of an aircraft incorporating the invention.
FIG. 1a is a section view.

In FIG. 1 an aircraft 9 incorporating the invention is illustrated as including a fuselage 5, a powerplant nacelle 6 including inlet and exhaust ends 6a and 6b, a tail 7 and a wing 1, two wing portions being shown, an integrated body/nacelle is illustrated but the invention applies also to conventional civil aircraft incorporating separate engine nacelles mounted on the wing or fuselage.

The trapezoidal wing as commonly defined with a theoretical root chord defined by the outboard leading edge 2 and outboard trailing edge 3 projected to the aircraft centerline is illustrated. The usual definition of aerodynamic aspect ratio is the square of the total span (length of the trapezoidal wing from tip 4 to tip 4a) divided by the area enclosed in the indicated trapezoidal area. The leading edge sweep angle ^ is defined as the minimum angle of the outboard trapezoidal wing leading edge 2 relative to a line projected normally from the aircraft longitudinal axis outboard.

A chord length at the side of body Csob is defined as the length of the trapezoidal wing chord approximately where it meets the fuselage or integrated fuselage/nacelle body. Said body is reduced in cross-section in proximity to the wing to compensate for the wing cross-section area per area rule considerations to minimize wave drag.

The exposed outer panel structural aspect ratio Ap is defined by the square of panel span b* divided by the trapezoidal area defined by the area extending from the side of body to the tip 4.

Panel aspect ratio Ap is generally a factor of somewhat less than ½ of the aerodynamic aspect ratio. A section view A-A represents a vertical section through the wing 8 located approximately 70% of the distance outboard between the body side and the wing tip at 4 and is generally representative of the wing for basic comparisons of Ap and t/c ratio. $(t/c)_{70}$ is equal to the ratio t70/C70, these dimensions shown in section A-A.

Definitions for the aspect ratio, panel area Ap, panel aspect ratio, t70, C70, ATC parameter, and sweep are applied similarly to tail control surface 7.

Location 11 shows a reduction in cross-sectional area of the body and/or nacelle adjacent to wing 1a to reduce wave drag per area rule considerations and viscous drag through modifying cross-flow pressure gradients across the wing surface. Location 12 shows modification of cross-sectional area adjacent to tail 7a.

Figure 2:
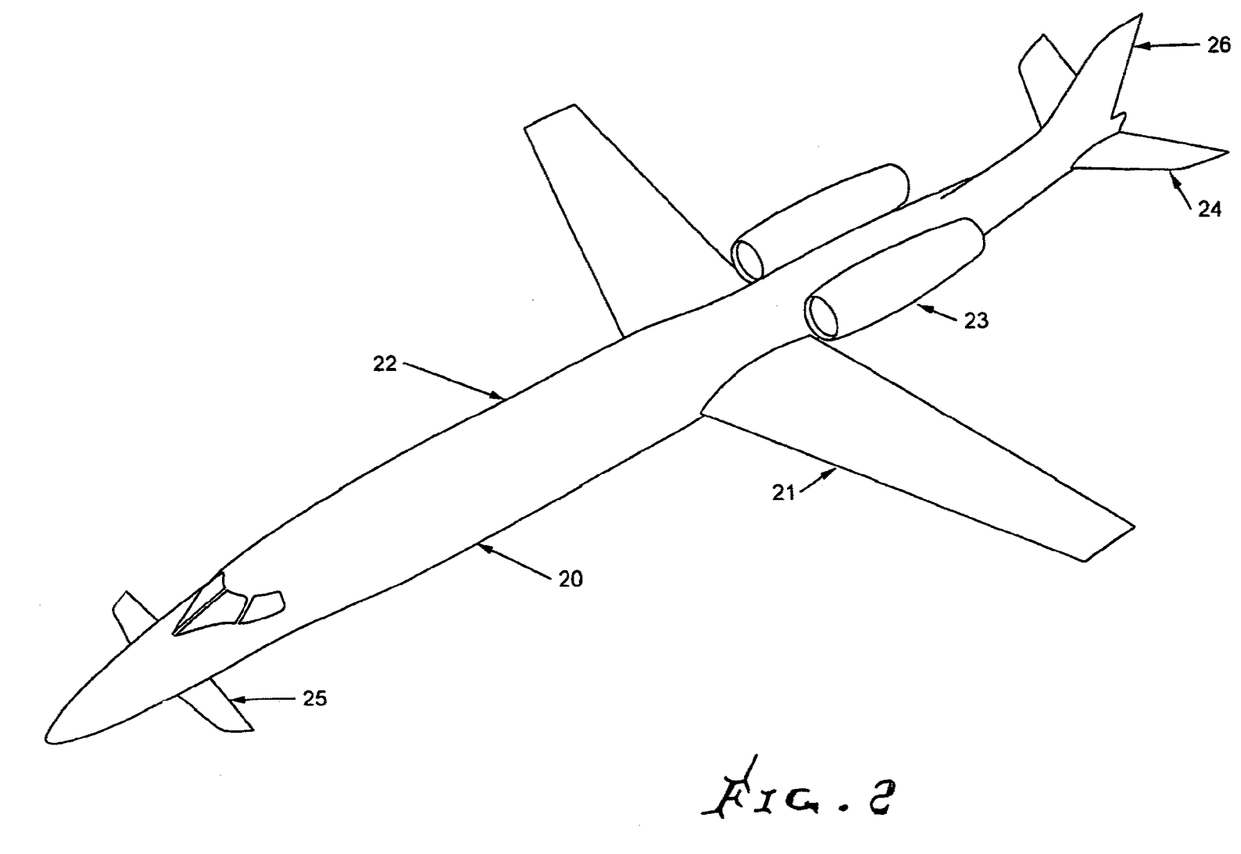
FIG. 2 is an isometric view of an aircraft incorporating the invention

FIG. 2 shows an alternative preferred aircraft configuration 20 incorporating the invention, featuring a fuselage body 22, engine nacelle 23, wing 21, an aft located horizontal tail surface 24, and aft located vertical tail surface 26, and a forwardly located canard surface 25. Any or all the of wing and control surfaces 21, 24, 25, 26 may incorporate planform, sweep, and thickness geometries described previously. The fuselage body 22 and/or nacelle 23 may have reduced cross-section adjacent to surfaces 21, 24, 25, or 26 to reduce drag as previously described.

Figure 3:
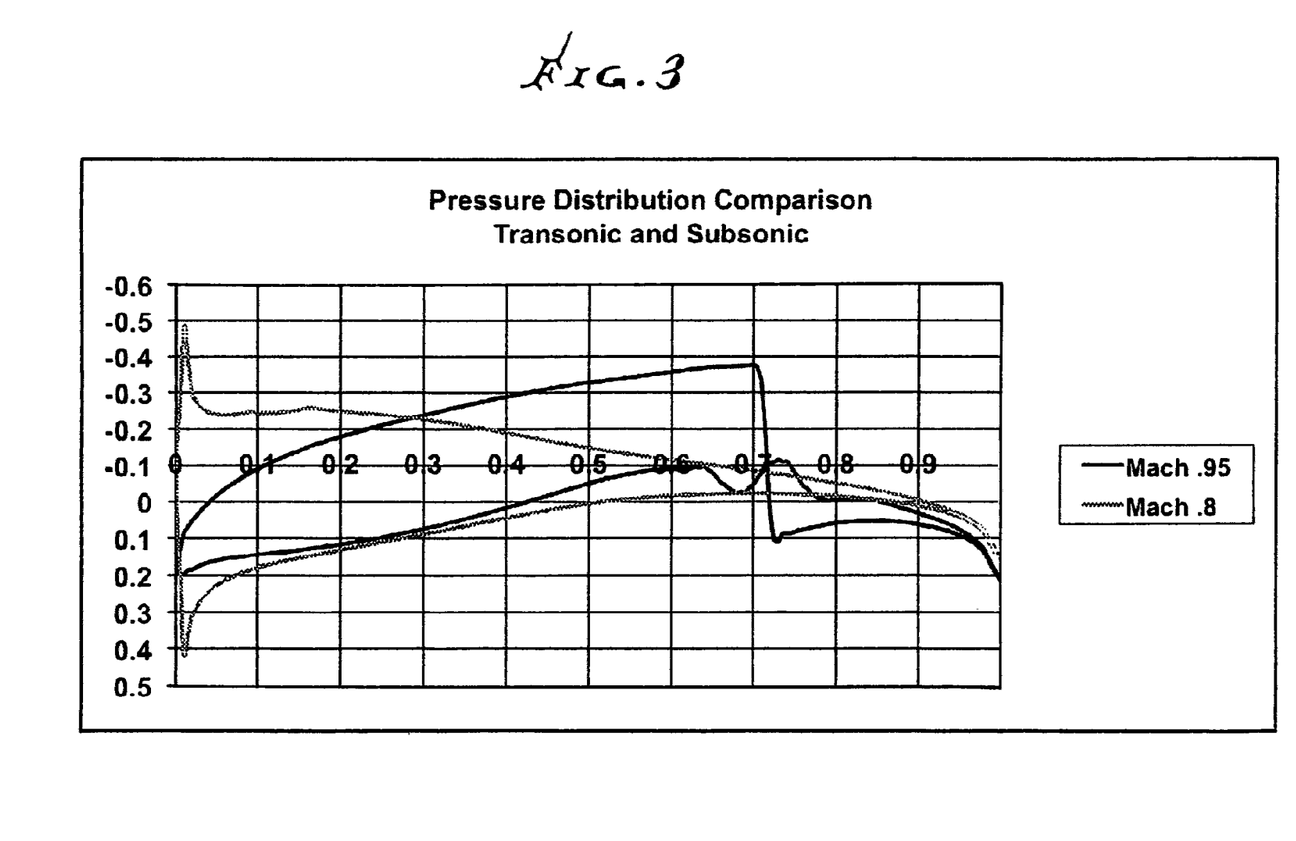
FIG. 3 is a graph illustrating an airfoil pressure distribution favorable to laminar flow at a Mach number of 0.95; Mach 0.8 pressure distributions along the wing airfoil are also shown.

FIG. 3 illustrates the pressure contours lengthwise of the wing of a blunt leading edge airfoil designed to foster natural laminar flow for a design cruise Mach number of 0.95. Favorable negative pressure gradients conducive to laminar flow extend from the leading edge of both lower and upper surfaces until recovery shock waves impinge on the surface at approximately 65% of chord length.

Figure 4:
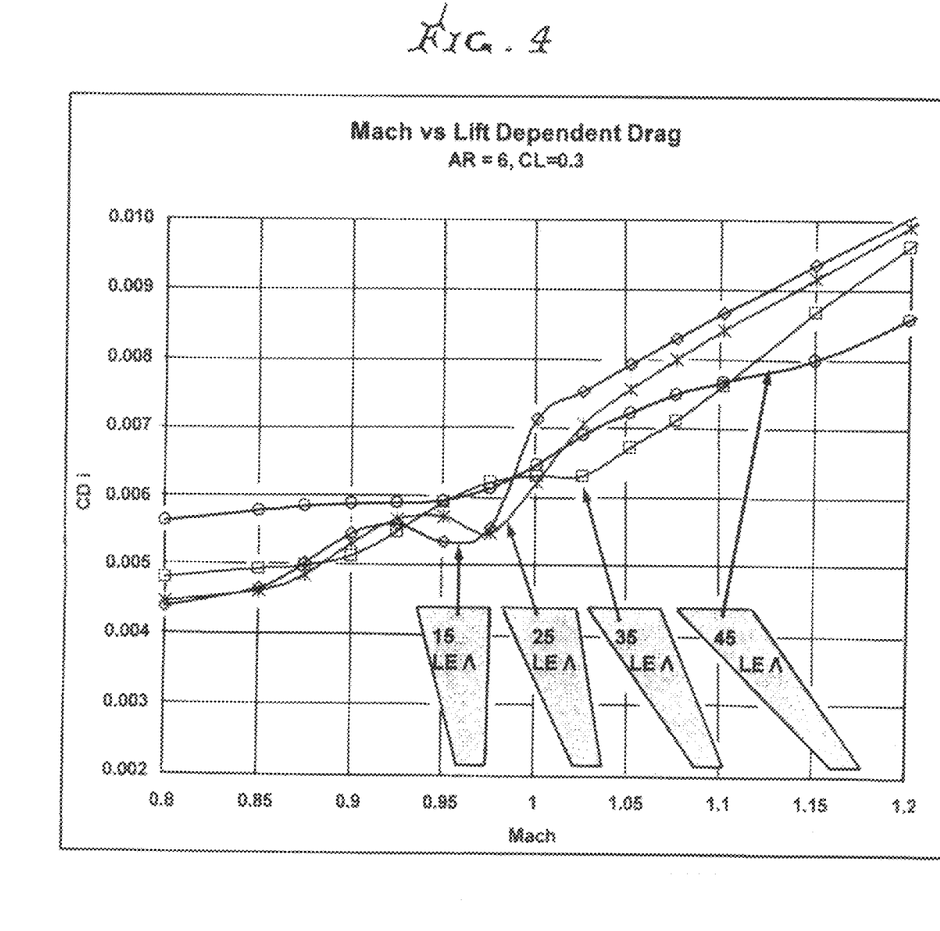
FIG. 4 is a graph illustrating the lift dependent drag coefficient for a series of wings of progressive sweep.

FIG. 4 illustrates the results of CFD analysis for a family of isolated wings with the same thickness and aspect ratio but with varying sweep. The non-viscous lift dependent drag coefficient is shown to dip to a minimum value just below Mach 1 with the 15° and 25° low sweep wings, however this characteristic disappears as sweep is further increased to wing sweep values of 35° and 45°. This is illustrative of the non-viscous improvements to drag of low sweep wings, which is in addition to the potential reduction in viscous drag available due to laminar flow with reduced sweep.

Figure 5:
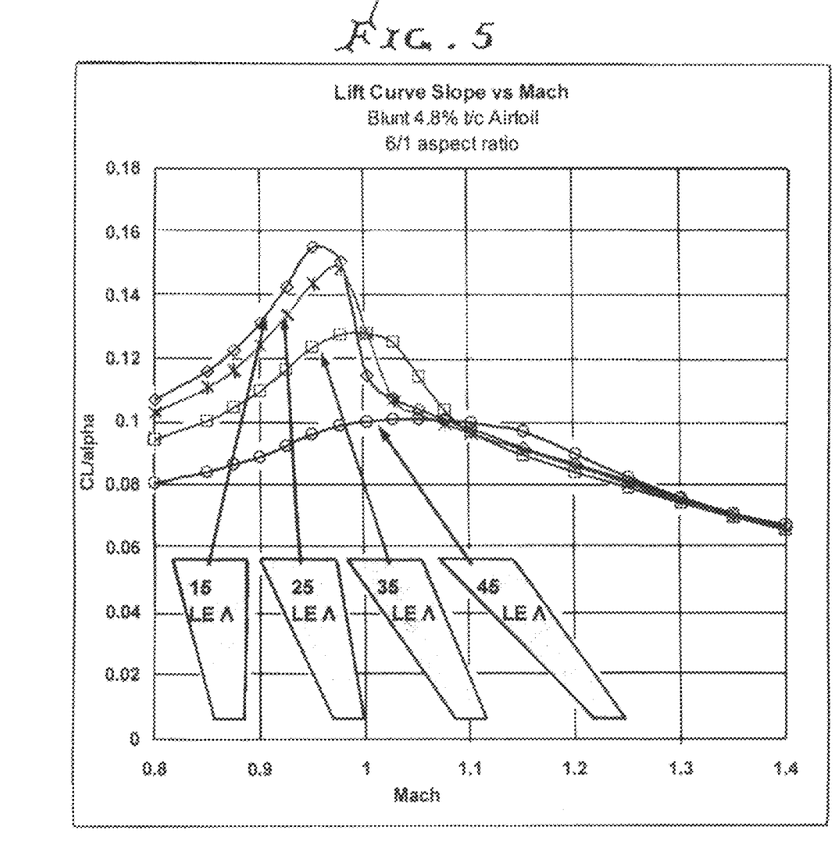
FIG. 5 is a graph illustrating the lift curve slope of a series of wings of progressively greater sweep.

FIG. 5 illustrates the aerodynamic cause of the structural penalty associated with reduced sweep near Mach 1. The same aerodynamic characteristic that reduces lift dependent drag just below Mach 1 also increases the lift curve slope, which is the change in lift with a change in angle of attack. This increases the sensitivity to gust loads of a wing and increases the aerodynamic forces tending to deflect the wing torsionally which can lead to divergence or flutter. Increasing sweep to conventional values of 35 degrees or more typical of current transonic and supersonic aircraft is seen to "round off" and reduce this peak, providing a structural weight advantage but with an aerodynamic penalty as discussed above.

Figure 6:
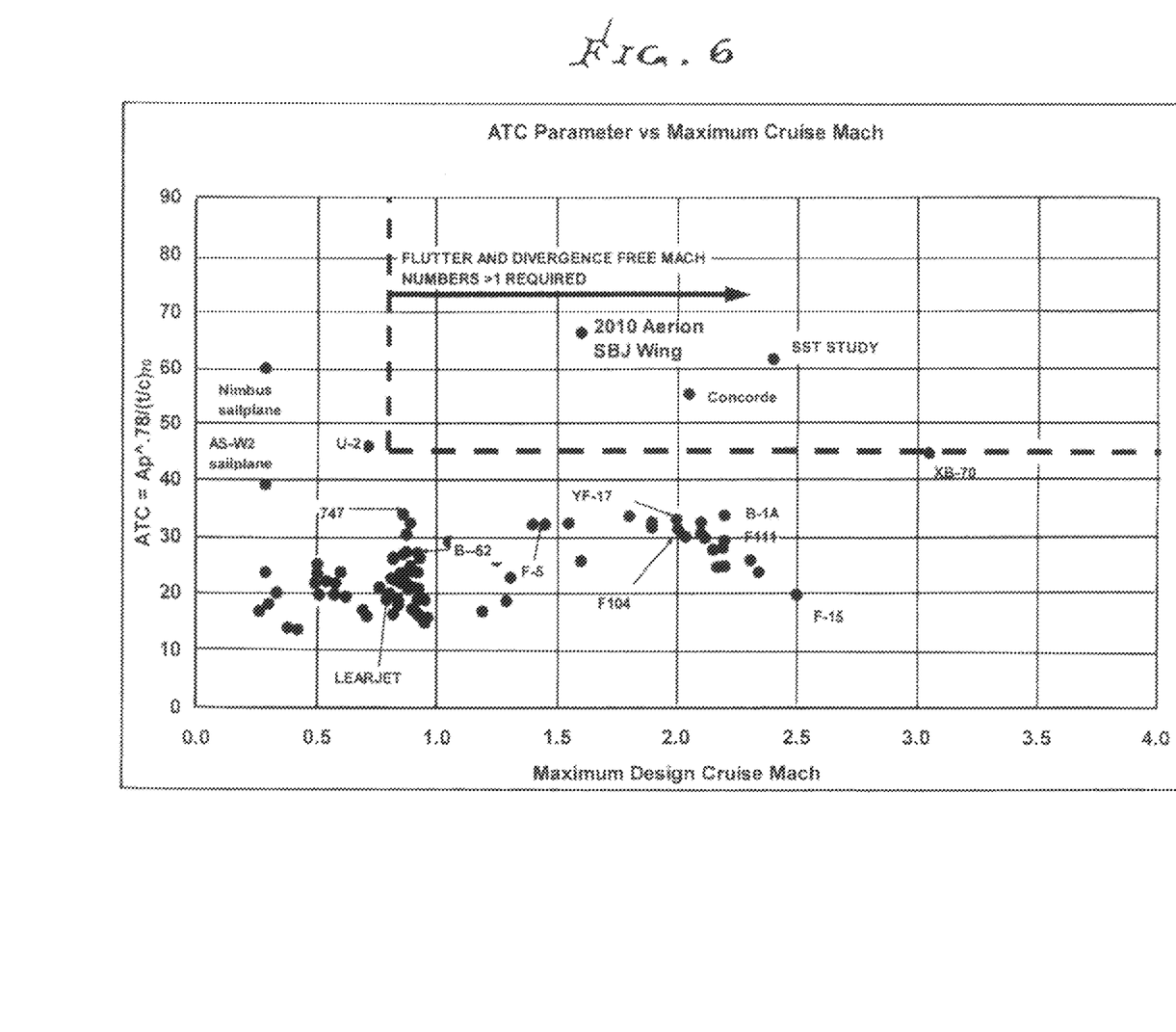
FIG. 6 is chart of calculated values of the ratio of $Ap^{\wedge}0.78/(t/c)_{70}$ for existing and proposed aircraft compared to their maximum operating Mach numbers.

The values of $ATC = Ap^{0.78}/(t/c)_{70}$ for a large number of existing and a few proposed aircraft plotted against their maximum operating Mach number is illustrated in FIG. 6. Three low speed aircraft with ATC values exceeding 40 are seen, two sailplanes and the ubiquitous U-2, which was designed to a maximum cruise Mach number of 0.714, a level where structural integrity would not need to be justified above Mach 0.90. Two supersonic cruise aircraft, the Concorde and a supersonic transport design study aircraft had values exceeding ATC of 45. These two aircraft both incorporated very high leading edge sweep angles greater than 50 degrees, avoiding the challenge for meeting higher gust loads and flutter requirements endemic with more efficient lower sweep wings.

Figure 7:
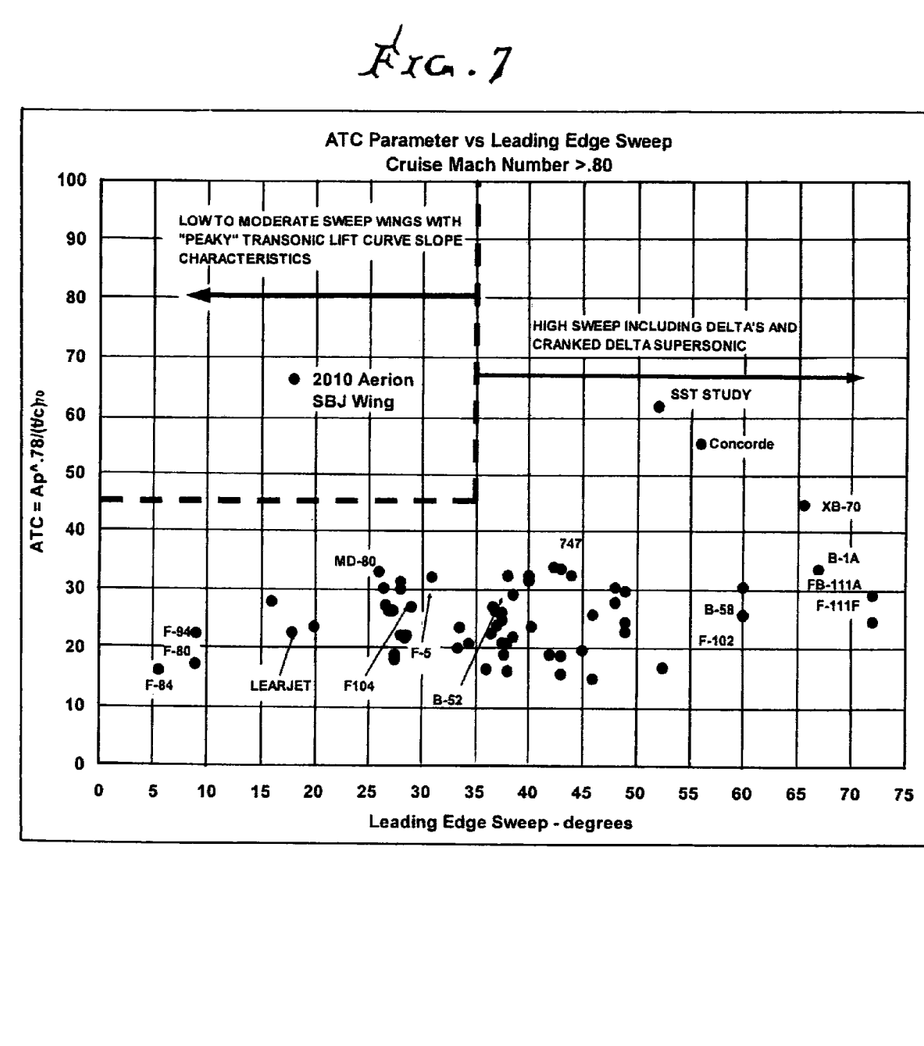
FIG. 7 is a chart of calculated values of the ATC parameter $Ap^{\wedge}0.78/(t/c)_{70}$ for existing and proposed aircraft wings compared to their outboard trapezoidal leading edge sweep angle.

This leading edge sweep factor is illustrated in FIG. 7, which plots the ATC values for aircraft designed to operate above Mach 0.80 versus leading edge sweep.

Included in the charts are the values for an Aerion Corporation supersonic business jet (SBJ) wing recently designed and analyzed for both acceptable structural strength and flutter resistance.

Figure 8:
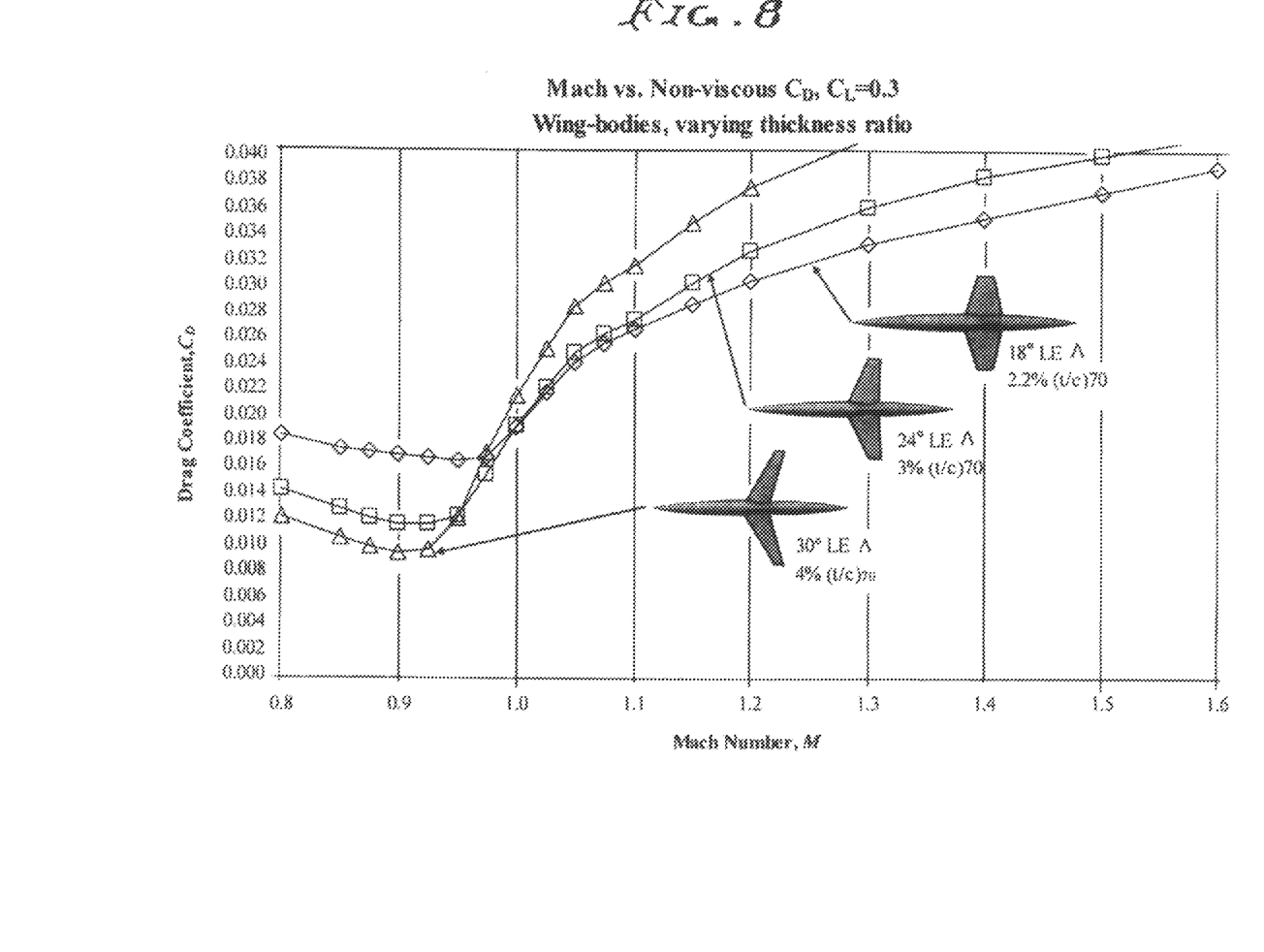
FIG. 8 is a graph illustrating the non-viscous drag versus Mach results from CFD analysis at a lift coefficient of 0.30 for a series of wing-bodies with the outer wings designed for a common Mdd of 0.96, identical $Ap^{\wedge}0.78/(t/c)_{70}$ ratios of 63, thickened inboard wing roots and the body cross-sections waisted in proximity to the wing per area rule considerations.

FIG. 8 illustrates the high order CFD analysis of a series of wing bodies. The wings were designed to have the same $M_{dd}$ at the 70% panel span location for the given sweep and t/c. The wing aspect ratio's were based on an ATC value of 63 and were thickened inboard proportional to the respective $(t/c)_{70}$. The bodies were reduced in cross-section adjacent to the wings to approximate a Mach 1.05 supersonic area rule distribution. As shown, the non-viscous drag for a lift coefficient of 0.3 are nearly identical for the 3 and 4% t/c wings at the Mach 0.95 design condition, however the lower aspect ratio possible with the thinner 3% wing exhibits lower drag in the vicinity of Mach 1.05 but higher drag for speeds below the design condition.

What is claimed is:

1. Aircraft configured to operate at Mach numbers from above 0.80 and up to about 1.2 with wing sweep angles defined by the wing outboard leading edge of less than 35 degrees, and incorporating calculated values of the ratio of outboard wing panel aspect ratio raised to an exponent of 0.78, divided by the ratio of maximum thickness divided by chord (t/c), greater than about 45, characterized by one of the following: a) where said maximum thickness divided by chord (t/c) is at a location approximately 70% of the distance outboard from the attaching aircraft body to the wing tip, or b) where said maximum thickness divided by chord (t/c) is the average value of (t/c)'s located between approximately 50% of the distance outboard from the attaching aircraft body to the wing tip.

2. The aircraft of claim 1 with wing shapes configured to provide pressure gradients favorable to generating extensive laminar flow on upper, lower, or both wing surfaces.

3. The aircraft of claim 1 with t/c ratios substantially greater at locations inboard of the 50% wing span location as defined in claim 1 than at other locations.

4. The aircraft of claim 1, combined with fuselage body and/or engine nacelle bodies with cross-sectional areas reduced adjacent to the wing or wings so as to reduce Mach related wave drag, such areas being in planes normal to flight direction.

5. The aircraft of claim 2 where the wing is defined as a tail or forward canard stabilizing or control surface.

6. The aircraft of claim 3 where the wing is defined as a tail or forward canard stabilizing or control surface.

7. The aircraft of claim 4 where the wing is defined as a tail or forward canard stabilizing or control surface.

8. The aircraft of claim 1 wherein the t/c ratio is greater than 0.03.

9. The aircraft of claim 2 wherein the t/c ratio is greater than 0.03.

10. The aircraft of claim 3 wherein the t/c ratio is greater than 0.03.

11. The aircraft of claim 4 wherein the t/c ratio is greater than 0.03.

12. The aircraft of claim 5 wherein the t/c ratio is greater than 0.03.

13. The aircraft of claim 1 wherein the t/c ratio is less than 0.08.

14. The aircraft of claim 2 wherein the t/c ratio is less than 0.08.

15. The aircraft of claim 3 wherein the t/c ratio is less than 0.08.

16. The aircraft of claim 4 wherein the t/c ratio is less than 0.08.

17. The aircraft of claim 5 wherein the t/c ratio is less than 0.08.

18. The aircraft of claim 6 wherein the t/c ratio is less than 0.08.

19. The aircraft of claim 1 characterized by
   i) maximum design cruise Mach number greater than 1.2, and
   ii) panel $Ap^{0.78}/(t/c)_{70}$ exceeding 67.

20. The aircraft of claim 19 characterized by wing leading edge sweep angularity less than 35 degrees.

* * * * *